(12) United States Patent
Flatscher

(10) Patent No.: US 6,671,092 B2
(45) Date of Patent: Dec. 30, 2003

(54) REFLECTIVE MEASURING SCALE GRADUATION AND METHOD FOR ITS MANUFACTURE

(75) Inventor: Georg Flatscher, Schneizlreuth (DE)

(73) Assignee: Johannes Heidenhain GmbH, Traunreut (DE)

( * ) Notice: Subject to any disclaimer, the term of this patent is extended or adjusted under 35 U.S.C. 154(b) by 168 days.

(21) Appl. No.: 09/801,449

(22) Filed: Mar. 8, 2001

(65) Prior Publication Data

US 2001/0021485 A1 Sep. 13, 2001

(30) Foreign Application Priority Data

Mar. 10, 2000 (DE) .......................... 100 11 872

(51) Int. Cl.[7] .............. G02B 5/00; G02B 5/28
(52) U.S. Cl. .............. 359/436; 359/585; 359/587; 250/237 G; 33/493
(58) Field of Search .............. 359/576, 587, 359/436, 439, 585; 33/493; 250/237 G

(56) References Cited

U.S. PATENT DOCUMENTS

| | | | |
|---|---|---|---|
| 3,521,961 A | * | 7/1970 | Heidenhain et al. ........ 359/585 |
| 4,286,871 A | | 9/1981 | Erickson ................ 250/237 G |
| 4,644,156 A | | 2/1987 | Takahashi et al. | 
| 6,027,815 A | | 2/2000 | Hsu |

FOREIGN PATENT DOCUMENTS

| | | | |
|---|---|---|---|
| DE | 1 279 944 | | 5/1969 |
| DE | 31 29 357 | | 7/1989 |
| EP | 0 497 742 | | 8/1992 |
| EP | 0 773 458 | | 5/1997 |
| GB | 2153995 A | * | 8/1985 |
| JP | 61 045923 | | 3/1986 |
| JP | 9-33221 A | * | 2/1997 |

OTHER PUBLICATIONS

"Mirrors", Oriel Corporation Product Catalog, vol. III, Optics & Filters. pp. 5–2 to 5–5, (c) 1990.*
"High Reflection Coatings", MELLES GRIOT Catalog 1997–1998, pp. A5.23–A5.27, (c) 1997.*

* cited by examiner

Primary Examiner—John Juba
(74) Attorney, Agent, or Firm—Kenyon & Kenyon

(57) ABSTRACT

A reflective measuring scale graduation, as well as a method for manufacturing the same are described. The reflective measuring scale graduation includes first and second subdivisions having different reflection properties, which extend in at least one first direction on a reflecting substrate. The highly reflecting first subdivisions are made of a plurality of partial layers having different indices of refraction and function as an interference filter. The low reflecting second subdivisions are composed of at least one absorber layer on the substrate.

28 Claims, 3 Drawing Sheets

REFLECTIVE MEASURING SCALE GRADUATION AND METHOD FOR ITS MANUFACTURE

FIELD OF INVENTION

The present invention relates to a reflective measuring scale graduation and to a method for its manufacture.

BACKGROUND OF THE INVENTION

Incident light position-measuring instruments usually include a reflective measuring scale graduation, as well as a scanning device that is movable in relation thereto. A light source, arranged on the scanning-device radiates a beam of light in the direction of the reflective measuring scale graduation. The beam of light is then re-reflected in the direction of the scanning device where, modulated as a function of shift, the light passes through one or more scanning scale divisions to finally be detected by an opto-electronic detector system. The resulting shift-modulated sampled scanning signals are then further processed by a downstream evaluation unit.

Known reflective measuring scale graduations used in these position-measuring instruments usually include a substrate on which subdivisions having different reflection properties are arranged so as to alternate in the measuring direction. For example, a chromium coating may be applied over the entire surface of a steel substrate and then absorbent or low-reflecting subdivisions of chromium oxide ($Cr_2O_3$) may be arranged on top of the chromium layer. The highly reflecting subdivisions are then formed by the chromium subdivisions non-covered by the oxide.

Another known reflective measuring scale graduation is disclosed in U.S. Pat. No. 4,644,156. It describes using a photoresist to form non-reflective coated subdivisions on an aluminum substrate. The highly reflecting subdivisions are then formed by the exposed aluminum subdivisions.

Reflecting measuring scale graduations of this kind must meet a number of requirements. Such requirements include, inter alia, a high abrasion resistance, substantial reflectivity in the highly reflecting subdivisions, a high light absorption in the low reflecting subdivisions, and a low sensitivity to contamination. The variants of a reflective measuring scale graduation described above prove to be relatively sensitive to contamination. Thus, contamination from coolants or lubricants significantly reduces the reflectivity of the highly reflecting subdivisions, while substantially increasing the reflectivity in the low-reflecting subdivisions. Overall, the modulation factor of the scanning signals is clearly reduced by contamination when this measuring scale graduation is used in an optical reflected light position-measuring instrument.

To overcome this difficulty, German Patent 1,279,944 proposes forming the low-reflecting subdivisions of a reflective measuring scale graduation as anti-reflecting interference layers. The highly reflective subdivisions include gold layers. A drawback of this kind of reflective measuring scale graduation is that it requires an expensive manufacturing process. The requisite layer thickness of the dielectric interference layers must be precisely adjusted over the entire surface of the metal substrate. In addition, it is necessary to deposit a substantial number of individual partial layers on the substrate, making the manufacturing process even more costly.

SUMMARY OF INVENTION

The present invention is a reflective measuring scale graduation that is substantially insensitive to contamination and a method for manufacturing the same.

The reflective measuring scale graduation according to the present invention, as well as the method according to the present invention offer a number of advantages over previous approaches. For example, the sampled scanning signals maintain a high modulation factor even in the presence of contamination. There is also sufficient reflectivity in the highly reflecting subdivisions and adequate light absorption in the low-reflecting subdivisions of the measuring scale graduation in the presence of contamination. In addition, the reflecting measuring scale graduation according to the present invention also has a high mechanical load capacity. The method according to the present invention requires only a few process steps. For example, only one pattern delineation step is needed and no complex processes are required to adjust the requisite layer thickness.

In one aspect, the invention is a reflective measuring scale graduation comprising a reflective substrate, highly reflective first subdivisions disposed on the reflective substrate comprising a plurality of first partial layers and second partial layers, the plurality of first and second partial layers having different indices of refraction and forming an interference filter, and low reflecting second subdivisions comprising at least one absorber layer disposed on the reflecting substrate, the first and second subdivisions having different reflection properties and extending in at least one first direction on the reflecting substrate.

In a different aspect, the invention is a method for manufacturing a reflective measuring scale graduation comprising a first and second subdivisions having different reflection properties. The scale extends in at least one first direction on a reflecting substrate. The method comprises depositing a first partial layer having a low refraction index on the reflecting substrate, patterning the first partial layer so that the first partial layer covers the substrate in the first subdivisions, while the substrate is uncovered in the second subdivisions, and depositing of a second partial layer on the first and second subdivisions, the second partial layer having a greater refraction index than the first partial layer.

Further advantages as well as details pertaining to the present invention are included in the following description of the enclosed figures.

DETAILED DESCRIPTION OF DRAWINGS

Figure 1:
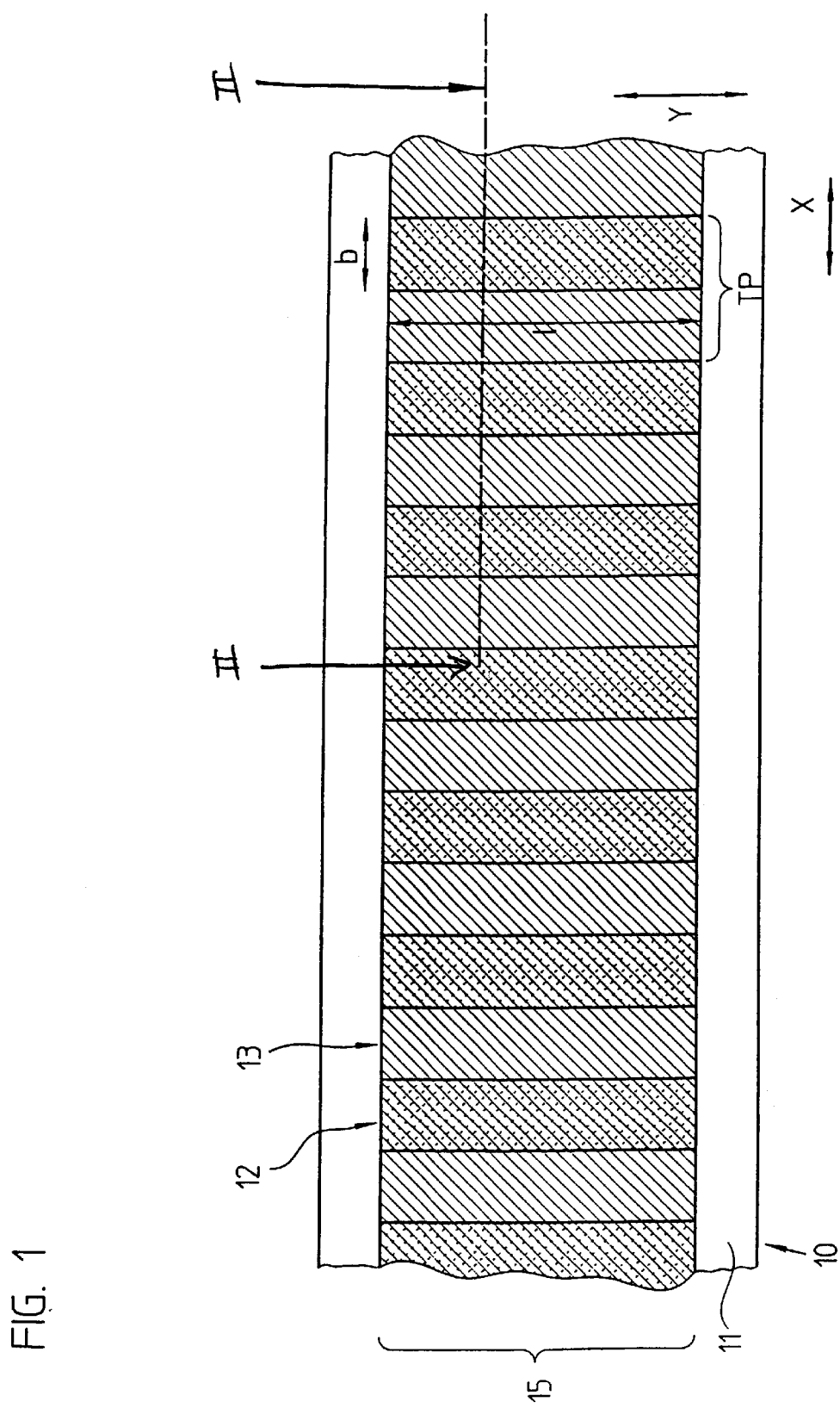
FIG. 1 is a plan view of a section showing an embodiment of a reflecting measuring scale graduation in accordance with the present invention.

FIG. 1 shows a plan view of one section of a reflective measuring scale graduation 10 according to the present invention. In this exemplary embodiment, the reflective measuring scale graduation 10 is a linear incremental scale graduation. The linear incremental scale graduation is made up of first and second subdivisions 12 and 13, which are arranged so as to alternate in the x-direction, in a track 15 on a substrate 11. The first subdivisions 12 are highly reflective and the second subdivisions 13 are not reflective. Specific details regarding the design of the subdivisions 12 and 13 in accordance with the present invention are discussed in the description of FIGS. 2 and 3a–3e.

In the illustrated specific embodiment of an incremental scale graduation, subdivisions 12 and 13 have different reflective properties, can have an identical geometric shape, and can be made of narrow rectangles of width b in the x-direction and length 1 in the y-direction. The grating pitch TP is derived from the sum of widths b of the two subdivisions 12 and 13. The grating pitch TP is important in determining the resolution of such an incremental position-measuring device. The direction x, in which the subdivisions 12 and 13 are arranged corresponds to the measuring direction. In an alternative embodiment, an absolute-encoded measuring scale graduation in accordance with the present invention can be designed where subdivisions 12 and 13 have different widths b in the x-direction. A scanning device in a corresponding reflected light position-measuring instrument moves along the measuring direction relative to the reflective measuring scale graduation 10.

In an alternative embodiment of the present invention, the reflective measuring scale graduation may have a rotary design.

Figure 2:
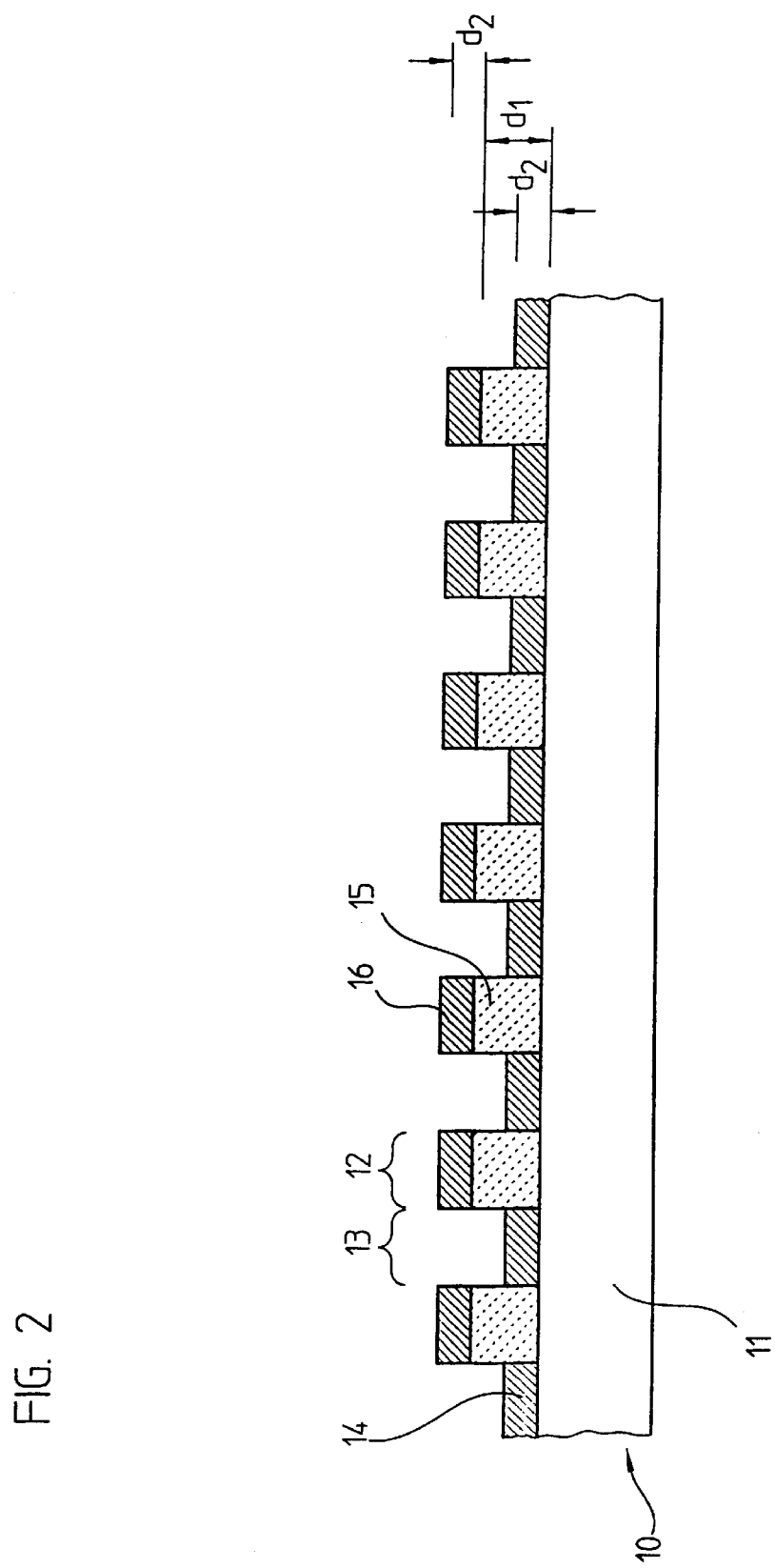
FIG. 2 is a cross-sectional view of the measuring scale graduation taken along the line 2—2 from FIG. 1.

FIG. 2 illustrates a sectional view of an exemplary embodiment of the reflective measuring scale graduation 10 in accordance with the present invention. In this embodiment, substrate 11 of reflective measuring scale graduation 10 is polished steel, which exhibits a high reflectivity for the incident of light. Alternatively, substate 11 may include other highly reflecting materials such as titanium (Ti), tungsten (W), molybdenum (Mo), platinum (Pt), tantalum (Ta) or chromium (Cr). The material selected for substrate 11 should not only exhibit the best possible reflection properties, but also sufficient mechanical load-bearing capacity. It is customary for the thickness of substrate 11 to be within the range of 1 mm and 15 mm.

The low reflecting subdivisions 13 of reflective measuring scale graduation 10 according to the present invention can be made of an absorber layer 14, which is disposed directly on substrate 11. In the illustrated exemplary embodiment, silicon (Si), which has an absorption constant k in the range of between k=0.1 and k=0.5, is provided as material for absorber layer 14. Alternatively, the absorber layer 14 may include weakly absorbent metal oxides. The thickness $d_2$ of absorber layer 14 is preferably selected in the range of between $d_2$=30 nm and $d_2$=50 nm. The proper material and design thickness for absorber layer 14 ensures that the second subdivisions 13 of the reflective measuring scale graduation 10 in accordance with the present invention only have a low-reflecting effect for the incident of light, both in the uncontaminated as well as, in some instances, the contaminated state. Thus, for example, the second subdivisions 13 can have a residual reflection of less than 10%.

The highly reflective, first subdivisions 12 include a first partial layer 15 that can be placed at the bottom, and a second partial layer 16, that can be placed at the top. Both layers can have a refraction index, $n_1$ and $n_2$, respectively. Second partial layer 16 is disposed on first partial layer 15, which is disposed on substrate 11. Both partial layers act as an interference filter. Accordingly, the highly reflecting subdivisions 12 of reflective measuring scale graduation 10 in accordance with the present invention form a dielectric reflection interference filter. To achieve the desired interference effect, refraction index $n_1$ of first partial layer 15, is selected to be lower than refraction index $n_2$ of second partial layer 16.

In the illustrated exemplary embodiment of FIG. 2, silicon dioxide ($SiO_2$) is selected as material for the low reflecting, first partial layer 15. Alternative materials for the first partial layer 15 can be aluminum oxide ($Al_2O_3$) or manganese fluoride ($MgF_2$). Thickness $d_1$ of first partial layer 15 can preferably be in the range of between $d_1$=100 nm to $d_1$=150 nm. In the present exemplary embodiment, refraction index $n_1$ of first partial layer 15 can be in the range of between $n_1$=1.3 and $n_1$=1.7.

In the present exemplary embodiment according to the present invention, silicon (Si), in addition to being the material for adsorber layer 14, is also the material for the highly refractive, second partial layer 16. Similar to adsorber layer 14, alternative materials for second partial layer 16, can include, for example, weakly absorbent metal oxides. In addition, thickness $d_2$ of second partial layer 16 can be substantially identical to thickness $d_2$ of absorber layer 14 and, accordingly, is within the range of between $d_2$=30 nm and $d_2$=50 nm. Refraction index $n_2$ of second partial layer 16 is preferably selected to be greater than or equal to 2.2.

The design of first, highly reflective subdivisions 12 of reflective measuring scale graduation 10, as described in accordance with the present invention, ensures that even in the event of contamination, a sufficiently high reflectivity is attained in these subdivisions 12. Thus, even in the event of contamination, there is always a residual reflectivity of about 75%–80%, such that, an optical scanning produces a well-modulated sampled scanning signal.

In addition, the refinement according to the present invention of highly reflective subdivisions 12 ensures a high mechanical load-bearing capacity.

A further advantage with respect to manufacturing reflective measuring scale graduation 10 in accordance with the present invention is derived from the fact that the same material can be selected for absorber layer 14 and for second partial layer 16. In the present example, this is silicon (Si). The relevant advantages are explained on the basis of FIGS. 3a–3e, in connection with the following description of an exemplary method according to the present invention for manufacturing a reflective measuring scale graduation 10 of this kind.

Figure 3A:
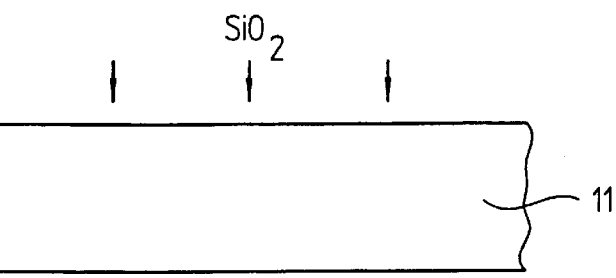
FIGS. 3a–3e are side views showing process stages for the manufacture of the reflective measuring scale graduation of the present invention.
Figure 3B:
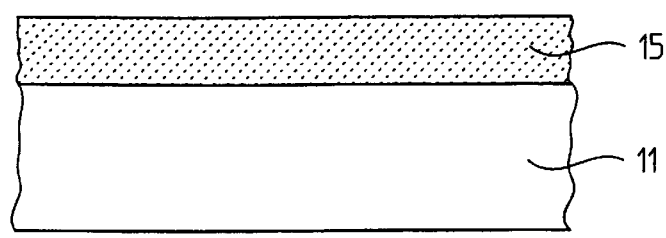

FIG. 3a illustrates an exemplary first step of a method to form a scale according to the present invention. A first partial layer is deposited on the surface of polished-steel substrate 11, using a physical vapor deposition (PVD) method, such as vapor or sputter coating deposition. As shown in FIG. 3b and as explained above, silicon dioxide ($SiO_2$) is provided as material for first partial layer 15.

Figure 3C:
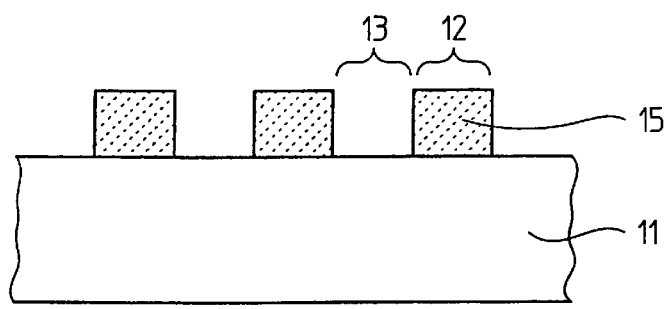
Figure 3D:
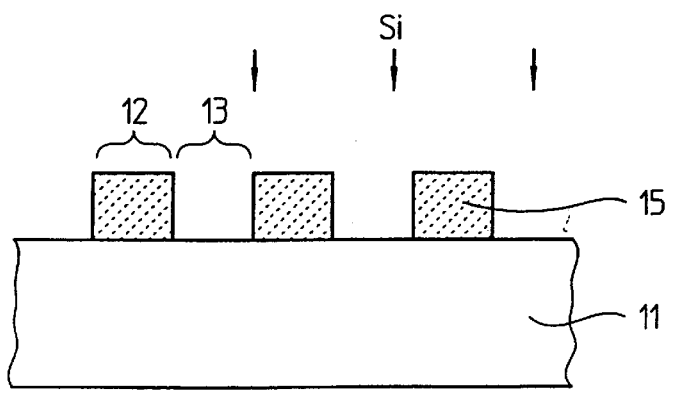

In the next method step in the illustrated example, the flat first partial layer 15 is patterned in such a way that first partial layer 15 remains in first subdivisions 12, while in the second subdivisions 13 situated therebetween, first partial layer 15 is completely removed. The result of this pattern-delineation step is shown in FIG. 3c. A pattern delineation of this kind is carried out with the aid of a conventional photolithographic method, which is not discussed in greater detail here.

There are alternative methods according to the present invention to obtain the pattern delineation as shown in FIG. 3c. In a first alternative method step, substrate 11 is coated over its entire surface with a photoresist. The photoresist is then patterned using a photolithographic method, resulting in subdivisions on substrate 11 with photoresist and other subdivisions without photoresist. These alternating areas correspond to subdivisions 12 and 13 in FIG. 3c. First partial layer 15 is subsequently deposited on substrate 11, inclusive of the patterned photoresist. In the next process step, those subdivisions where photoresist is present under first partial layer 15 are removed, resulting in the pattern delineation in accordance with FIG. 3c.

After the pattern delineation step in accordance with either the exemplary or alternative method, second partial layer 16 is then uniformly deposited on first and second subdivisions 12 and 13. To this end, in accordance with FIG. 3d, silicon (Si) is deposited as the material of second partial layer 16. To deposit the second partial layer 16 over the entire surface, a conventional PVD method such as vapor or sputter coating deposition, for example, can be used.

As already explained above, the materials for various partial layers 15 and 16 are selected in view of their refraction indices $n_1$ and $n_2$, respectively, so as to form a dielectric reflection interference filter in the area of the highly reflecting first subdivisions 13. In this case, refraction index $n_2$ of second partial layer 16 is considerably greater than refraction index $n_1$ of first partial layer 15. The thickness $d_1$ and $d_2$ of the two partial layers 15 and 16, respectively, can be selected as indicated above.

Figure 3E:
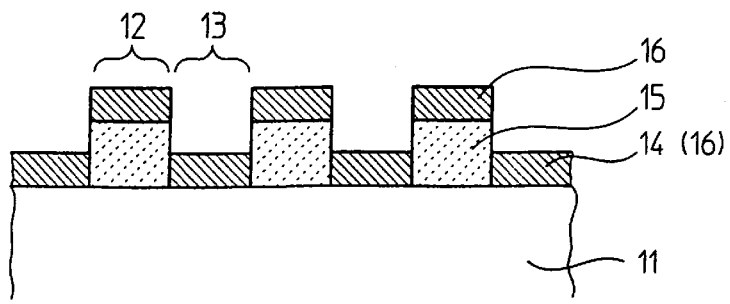

FIG. 3e shows the finished reflective measuring scale graduation 10.

As is apparent from the above description, the method according to the present invention for manufacturing a reflective measuring scale graduation requires only a few process steps. In the exemplary embodiment of FIGS. 3a–3e, only one single patterning step is required to pattern first partial layer 15 in such a way that it only remains in first subdivisions 12. In addition, this patterning step only requires removing a relatively thin first partial layer 15 in the second, low-reflecting subdivisions. It is also beneficial that the material for top-most partial layer 16 of reflecting subdivisions 12 and for absorber layer 14 be identical, so that the material can be simply deposited over the entire surface in the subsequent process step.

What is claimed is:

1. A reflective measuring scale graduation comprising:
   a reflective substrate;
   highly reflective first subdivisions disposed on the reflective substrate comprising a plurality of first partial layers and second partial layers, the plurality of first and second partial layers having different indices of refraction and forming an interference filter; and
   low reflecting second subdivisions comprising at least one absorber layer disposed on the reflecting substrate, the first and second subdivisions having different reflection properties and extending in at least one first direction on the reflecting substrate.

2. The reflective measuring scale graduation according to claim 1, wherein the first partial layer is a bottom-most layer and the second partial layer is a top-most partial layer.

3. The reflective measuring scale graduation according to claim 1, wherein the reflecting substrate comprises polished steel.

4. The reflective measuring scale graduation according to claim 1, wherein the second partial layer and the first partial layer of the highly reflecting first subdivisions have different refraction indices.

5. The reflective measuring scale graduation according to claim 4, wherein the first partial layer has a lower refraction index than the second partial layer, and is disposed directly on the reflecting substrate.

6. The reflective measuring scale graduation according to claim 4, wherein the refraction index of the first partial layer is between about 1.3 and 1.7.

7. The reflective measuring scale graduation according to claim 4, wherein the refraction index of the second partial layer is greater than or equal to 2.2.

8. The reflective measuring scale graduation according to claim 1, wherein the first partial layer is selected from the group consisting of one of either $SiO_2$ and $Al_2O_3$.

9. The reflective measuring scale graduation according to claim 1 wherein the thickness of the first partial layer is between about 100 nm and 150 nm.

10. A reflective measuring scale graduation comprising:
    a reflective substrate;
    highly reflective first subdivisions disposed on the reflective substrate comprising a plurality of first partial layers and second partial layers, the plurality of first and second partial layers having different indices of refraction and forming an interference filter; and
    low reflecting second subdivisions comprising at least one absorber layer disposed on the reflecting substrate, the first and second subdivisions having different reflection properties and extending in at least one first direction on the reflecting substrate;
    wherein the absorber layer and the second partial layer of the highly reflective first subdivisions are made of identical material.

11. A reflective measuring scale graduation comprising:
    a reflective substrate;
    highly reflective first subdivisions disposed on the reflective substrate comprising a plurality of first partial layers and second partial layers, the plurality of first and second partial layers having different indices of refraction and forming an interference filter; and
    low reflecting second subdivisions comprising at least one absorber layer disposed on the reflecting substrate, the first and second subdivisions having different reflection properties and extending in at least one first direction on the reflecting substrate;
    wherein the absorber layer and the second partial layer of the highly reflective first subdivisions comprise silicon (Si).

12. A reflective measuring scale graduation comprising:
    a reflective substrate;
    highly reflective first subdivisions disposed on the reflective substrate comprising a plurality of first partial layers and second partial layers, the plurality of first and second partial layers having different indices of refraction and forming an interference filter; and
    low reflecting second subdivisions comprising at least one absorber layer disposed on the reflecting substrate, the first and second subdivisions having different reflection properties and extending in at least one first direction on the reflecting substrate;
    wherein the absorber layer and the second partial layer of the highly reflective first subdivisions have an absorption coefficient k in the range of between about $k=0.1$ and $k=0.5$.

13. A reflective measuring scale graduation comprising:
    a reflective substrate;
    highly reflective first subdivisions disposed on the reflective substrate comprising a plurality of first partial layers and second partial layers, the plurality of first and second partial layers having different indices of refraction and forming an interference filter; and
    low reflecting second subdivisions comprising at least one absorber layer disposed on the reflecting substrate, the first and second subdivisions having different reflection properties and extending in at least one first direction on the reflecting substrate;
    wherein the second partial layer is selected from the group consisting of silicon (Si) and light absorbent metal oxide.

14. A reflective measuring scale graduation comprising:

a reflective substrate;

highly reflective first subdivisions disposed on the reflective substrate comprising a plurality of first partial layers and second partial layers, the plurality of first and second partial layers having different indices of refraction and forming an interference filter; and low reflecting second subdivisions comprising at least one absorber layer disposed on the reflecting substrate, the first and second subdivisions having different reflection properties and extending in at least one first direction on the reflecting substrate;

wherein the thickness of the second partial layer is between about 30 nm and 50 nm.

15. A reflective measuring scale graduation comprising:

a reflective substrate;

highly reflective first subdivisions disposed on the reflective substrate comprising a plurality of first partial layers and second partial layers, the plurality of first and second partial layers having different indices of refraction and forming an interference filter; and low reflecting second subdivisions comprising at least one absorber layer disposed on the reflecting substrate, the first and second subdivisions having different reflection properties and extending in at least one first direction on the reflecting substrate;

wherein the highly reflective first subdivisions is a dielectric reflection interference filter.

16. A reflective measuring scale graduation comprising:

a reflective substrate;

highly reflective first subdivisions disposed on the reflective substrate comprising a plurality of first partial layers and second partial layers, the plurality of first and second partial layers having different indices of refraction and forming an interference filter; and low reflecting second subdivisions comprising at least one absorber layer disposed on the reflecting substrate, the first and second subdivisions having different reflection properties and extending in at least one first direction on the reflecting substrate, wherein the absorber layer and the second partial layer of the highly reflective first subdivisions are made of identical material.

17. The reflective measuring scale graduation according to claim 16, wherein the absorber layer and the second partial layer of the highly reflective first subdivisions comprise silicon (Si).

18. The reflective measuring scale graduation according to claim 16, wherein the first partial layer is a bottom-most layer and the second partial layer is a top-most partial layer.

19. The reflective measuring scale graduation according to claim 16, wherein the reflecting substrate comprises polished steel.

20. The reflective measuring scale graduation according to claim 16, wherein the absorber layer and the second partial layer of the highly reflective first subdivisions have an absorption coefficient k in the range of between about $k=0.1$ and $k=0.5$.

21. The reflective measuring scale graduation according to claim 16, wherein the second partial layer and the first partial layer of the highly reflecting first subdivisions have different refraction indices.

22. The reflective measuring scale graduation according to claim 21, wherein the first partial layer has a lower refraction index than the second partial layer, and is disposed directly on the reflecting substrate.

23. The reflective measuring scale graduation according to claim 21, wherein the refraction index of the first partial layer is between about 1.3 and 1.7.

24. The reflective measuring scale graduation according to claim 21, wherein the refraction index of the second partial layer is greater than or equal to 2.2.

25. The reflective measuring scale graduation according claim 16, wherein the first partial layer is selected from the group consisting of one of either $SiO_2$ and $Al_2O_3$.

26. The reflective measuring scale graduation according to claim 16, wherein the second partial layer is selected from the group consisting of silicon and light absorbent metal oxide.

27. The reflective measuring scale graduation according to claim 16, wherein the thickness of the first partial layer is between about 100 nm and 150 nm.

28. The reflective measuring scale graduation according to claim 16, wherein the thickness of the second partial layer is between about 30 nm and 50 nm.

* * * * *